D. McMILLAN,

Assignor, by mesne assignments, to C. M. McMILLAN and E. D. MYERS.

HARNESS LOOP.

No. 10,060. Reissued Mar. 7, 1882.

Witnesses:
A. M. Long
E. D. Carr

Inventor.
Duncan McMillan.

By Paine, Grafton & Lord
Attorneys.

N. PETERS, Photo-Lithographer, Washington, D. C.

UNITED STATES PATENT OFFICE.

DUNCAN McMILLAN, OF WEBSTER CITY, IOWA, ASSIGNOR, BY MESNE ASSIGNMENTS, TO CARRIE M. McMILLAN, OF SAME PLACE, AND EDWIN D. MYERS, OF CLEVELAND, OHIO.

HARNESS-LOOP.

SPECIFICATION forming part of Reissued Letters Patent No. 10,060, dated March 7, 1882.

Original No. 182,125, dated September 12, 1876. Application for reissue filed November 4, 1881.

*To all whom it may concern:*

Be it known that I, DUNCAN McMILLAN, of Webster City, in the county of Hamilton and State of Iowa, have invented certain new and useful Improvements in Harness-Loops; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The object of the present invention is to provide a metallic harness-loop which is adapted to receive and retain the ends of leather straps without the necessity of sewing the latter, as is generally practiced, the loops formed in the straps being designed for the reception of rings, buckles, or other analogous devices.

The invention consists in the construction of a double metallic loop, which hereinafter will be more fully described, and then set forth in the claim.

Figure 1:
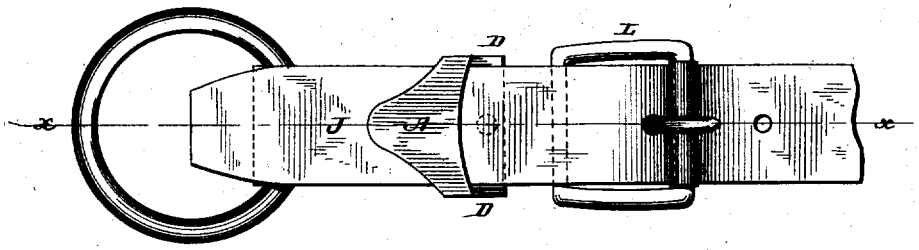
Figure 2:
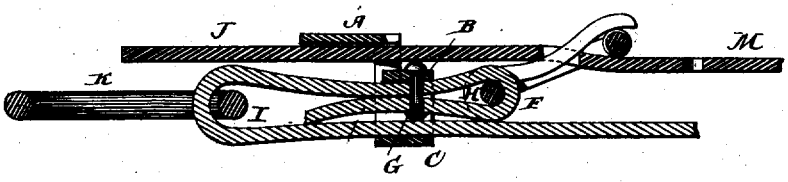

In the drawings, Figure 1 is a plan view of my improved loop, showing straps, a buckle, and a ring secured by it. Fig. 2 is a horizontal section taken on line *x x* of Fig. 1; and Fig. 3 is a perspective view of the double loop without the straps, the fastening rivet or tack, however, being in position to be passed through a strap.

Figure 3:
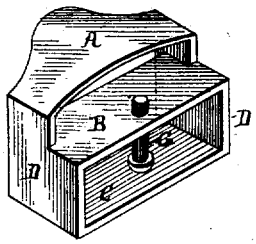

The loop is constructed of a top bar, A, an intermediate bar, B, a bottom bar, C, and two side bars, D, as is clearly shown in Fig. 3 of the drawings. The intermediate bar, B, serves to form two apertures or openings in the box or shell shaped loop, which are designed for the reception of different straps, as is more fully shown in Fig. 2. The cross-bar B is located intermediate the top and bottom cross-bars of the loop, and extends in a forward direction from the center of said loop, while the top cross-bar, A, extends in a rearward direction from the center of said loop.

The construction or formation just described will bring two of the cross-bars out of line with each other; or, in other words, the intermediate cross-bar is located in advance of the top cross-bar. An opening or hole made in the intermediate bar, B, at or about the center of the same, is designed to receive a rivet, tack, or pin, G, which is passed through a doubled strap, F, introduced into the bottom aperture or opening of the loop in the manner shown in Fig. 2. The strap F, after being doubled and retained by the rivet or tack G, so as to form a front leather loop, H, extends in a rearward direction, and is again returned through the bottom aperture of the loop below the doubled portion of the strap, which is secured by the rivet G. In this manner a rear leather loop, I, is formed, which generally serves to receive a harness-ring, K, while the front loop, H, in the strap has a buckle, L, fitted and secured therein. The tongue J of the strap M, which is secured by the buckle, passes through the upper aperture of the metal loop formed between the upper cross-bar and the intermediate bar, and in this manner the end or tongue portion of said strap is safely and neatly retained in place. The object of a metal loop having two distinct strap-openings and intermediate cross-bar located out of line or in advance of the top cross-bar is to permit the lower doubled strap to be retained in the lower loop-opening and secured to the intermediate bar by a rivet or pin, which is passed up from below and is riveted or headed down upon the upper surface of said intermediate bar. It will be manifest that this operation cannot well be performed when the intermediate and top cross-bars are located one directly above the other. In my case, however, the position of the cross-bars will enable the rivet or fastening device to be readily applied and removed, and a larger bearing or holding surface is also formed for the upper strap or the tongue portion of the buckle-strap, as will readily be apparent.

Having thus described my invention, what I claim as new, and desire to secure by Letters Patent, is—

The metallic harness-loop consisting of the top bar, A, the intermediate bar, B, extending in front of said top bar, the bottom bar, C, the side bars, D, and the rivet G, passed through the intermediate bar in front of the top bar, all constructed and relatively arranged as herein shown, and adapted to receive and secure a strap or straps, for the object stated.

In testimony whereof I affix my signature in presence of two witnesses.

DUNCAN McMILLAN.

Witnesses:
JAS. G. BONAR,
ERA LEWIS.